(12) United States Patent
Müller

(10) Patent No.: US 6,730,846 B1
(45) Date of Patent: May 4, 2004

(54) UNIVERSAL CABLE FITTING

(75) Inventor: Thorsten Müller, Menden (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 10/049,794

(22) PCT Filed: Aug. 13, 1999

(86) PCT No.: PCT/DE99/02547

§ 371 (c)(1), (2), (4) Date: May 29, 2002

(87) PCT Pub. No.: WO01/13485

PCT Pub. Date: Feb. 22, 2001

(51) Int. Cl.[7] .......................... H02G 15/02; H01R 4/00
(52) U.S. Cl. ................ 174/74 R; 174/77 R; 174/84 R; 174/93
(58) Field of Search ............... 174/74 R, 84 R, 174/92, 93, 77 R, 65 R

(56) References Cited

U.S. PATENT DOCUMENTS

| | | | |
|---|---|---|---|
| 3,636,241 A | * | 1/1972 | Baumgartner et al. ......... 174/92 |
| 4,117,259 A | * | 9/1978 | Giebel et al. ................. 174/92 |
| 4,538,021 A | * | 8/1985 | Williamson, Jr. .............. 174/92 |
| 4,994,630 A | * | 2/1991 | Schilling ...................... 174/41 |
| 5,006,669 A | * | 4/1991 | Bachel et al. ................. 174/93 |
| 5,498,839 A | * | 3/1996 | Behrendt et al. .............. 174/92 |
| 5,502,281 A | * | 3/1996 | Schoelling et al. ............ 174/92 |
| 5,886,300 A | * | 3/1999 | Strickler ...................... 174/135 |
| 6,107,571 A | * | 8/2000 | Damm ...................... 174/74 R |
| 6,198,048 B1 | * | 3/2001 | Juhel et al. ................ 174/84 R |
| 6,231,051 B1 | * | 5/2001 | Mueller et al. ............. 277/603 |
| 6,248,953 B1 | * | 6/2001 | Miller ...................... 174/74 R |
| 6,283,670 B1 | * | 9/2001 | Blankinship et al. ....... 403/313 |
| 6,359,228 B1 | * | 3/2002 | Strause et al. ................ 174/91 |
| 6,407,338 B1 | * | 6/2002 | Smith .......................... 174/92 |

* cited by examiner

*Primary Examiner*—William H. Mayo, III

(57) ABSTRACT

A universal cable fitting for a wide variety of applications includes a longitudinally slit sleeve tube (MR) and sealing bodies (DKG, DK, DKDP, DKS, DKO) on the ends of the sleeve tube. A sealing system is formed along the longitudinal edges of the sleeve tube by a sealing groove (DN), a sealing tongue (DF) and a wedge-shaped closure rail (LVS) that subjects a longitudinal seal (LD) to pressing during closure. Each sealing body is provided with a sealing groove (DU) for receiving an encircling seal (UD) having a corrugated profile. The sealing groove is provided in the direction of the encircling seal with a cutout into which an extension (AS) of the longitudinal seal penetrates. The cutout and the extension in the longitudinal seal produce direct contact with the encircling seal located in the sealing groove of the sealing body.

22 Claims, 12 Drawing Sheets

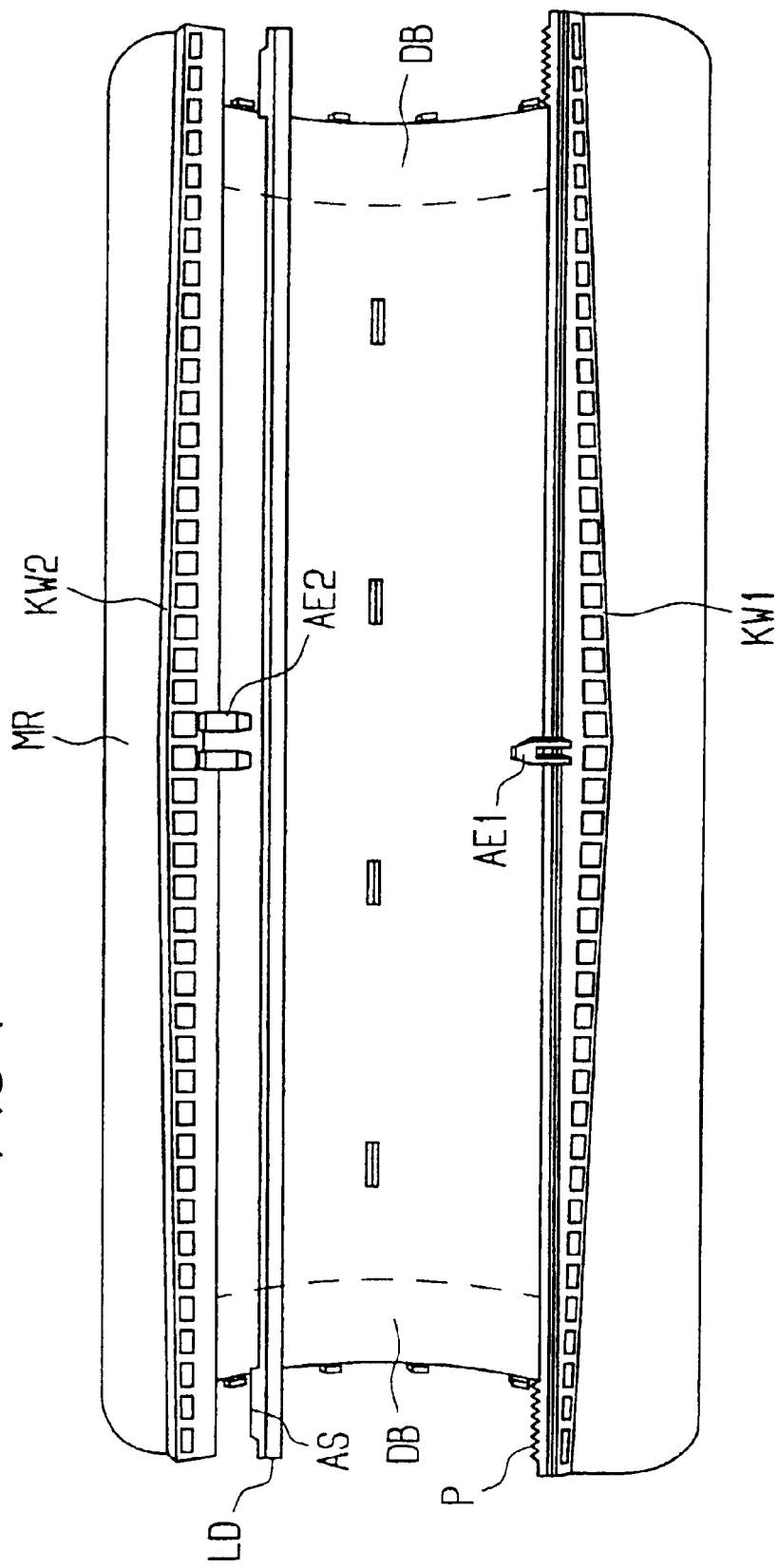

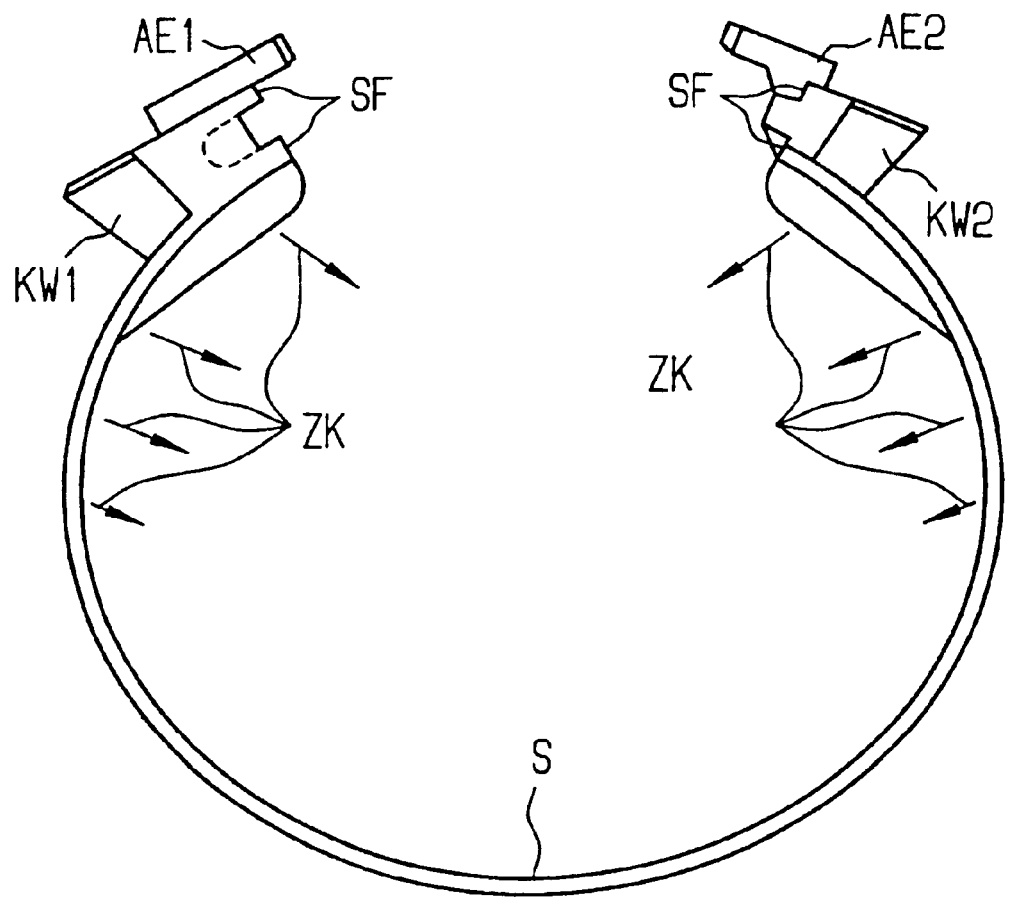
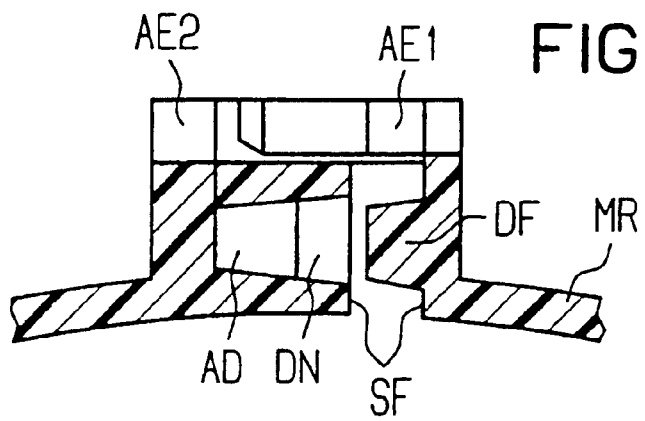

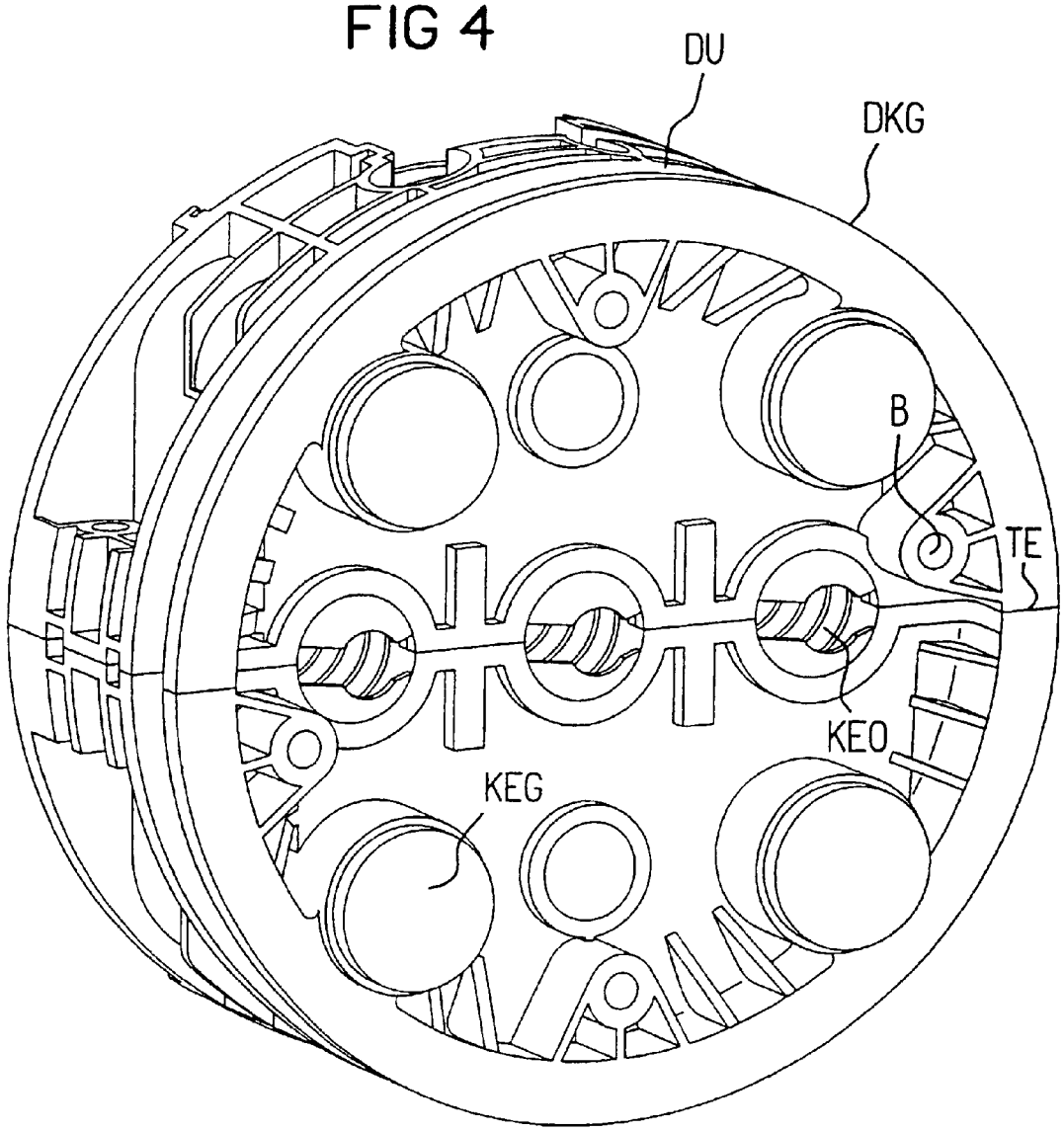

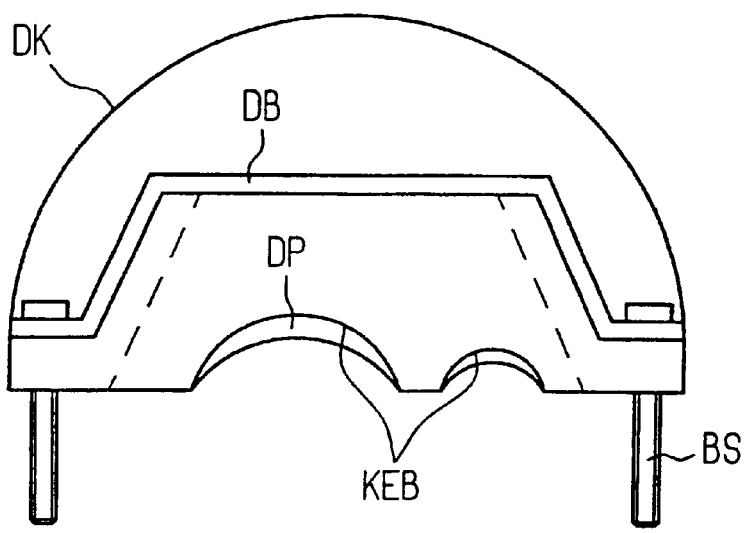
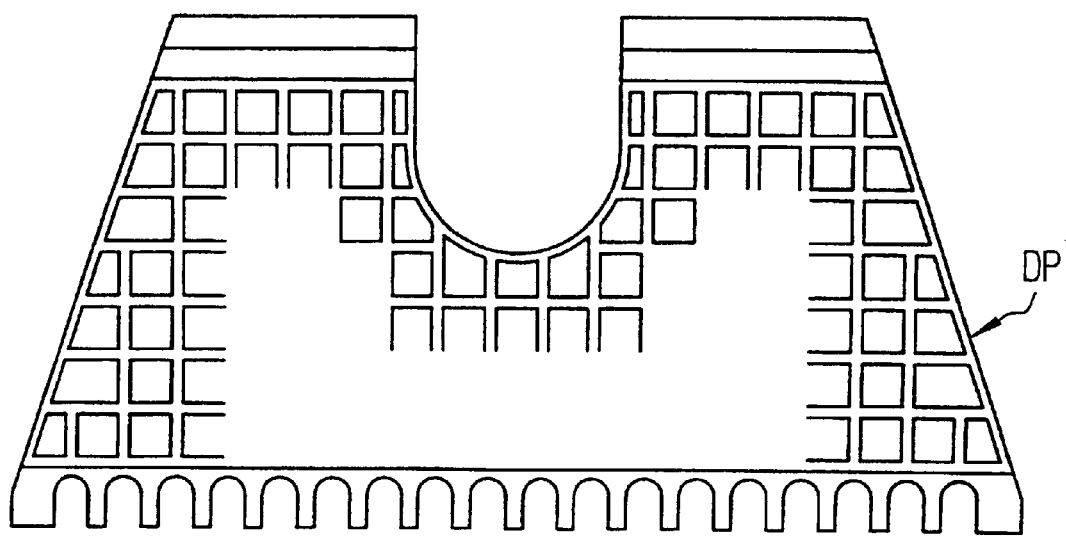

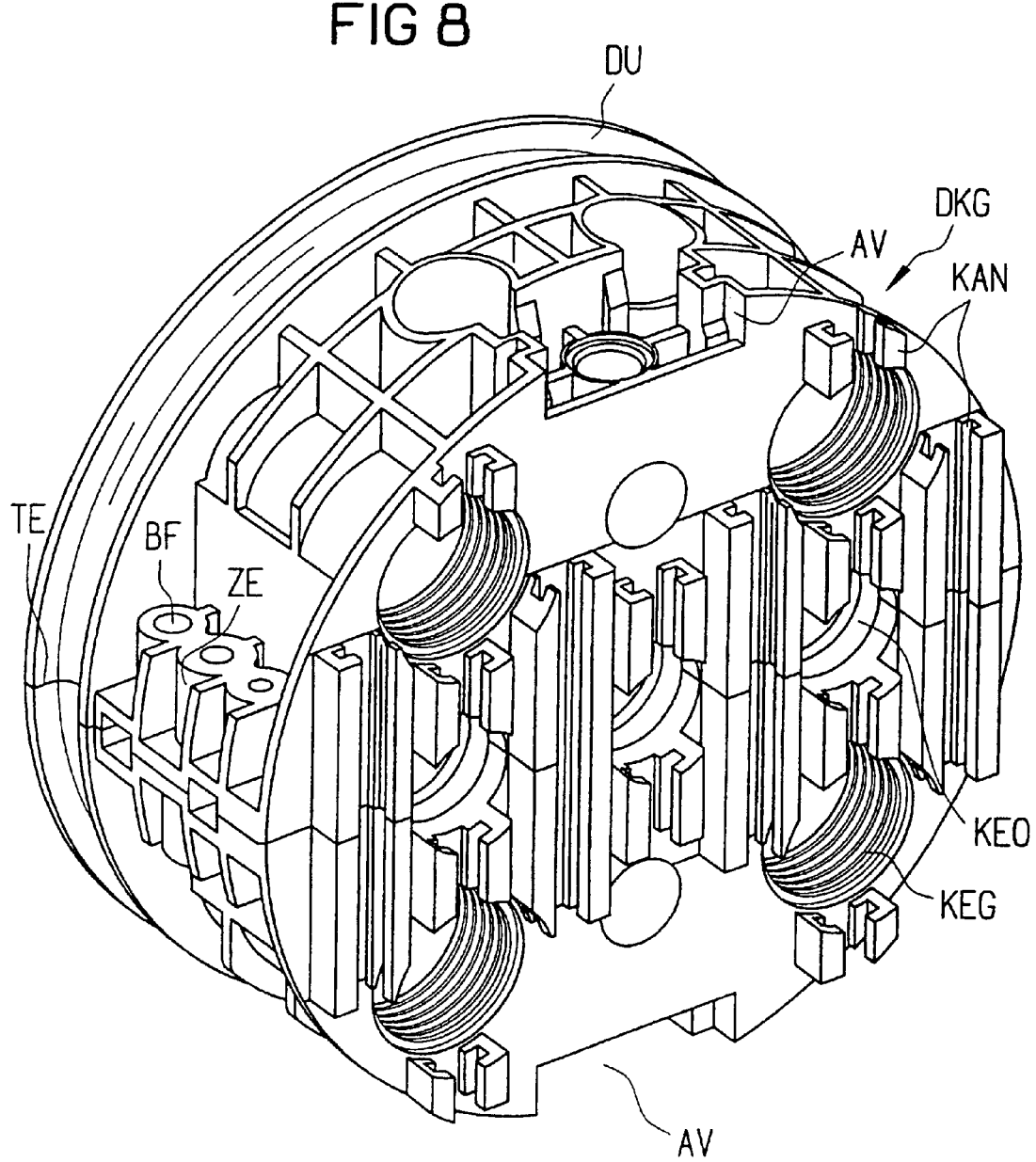

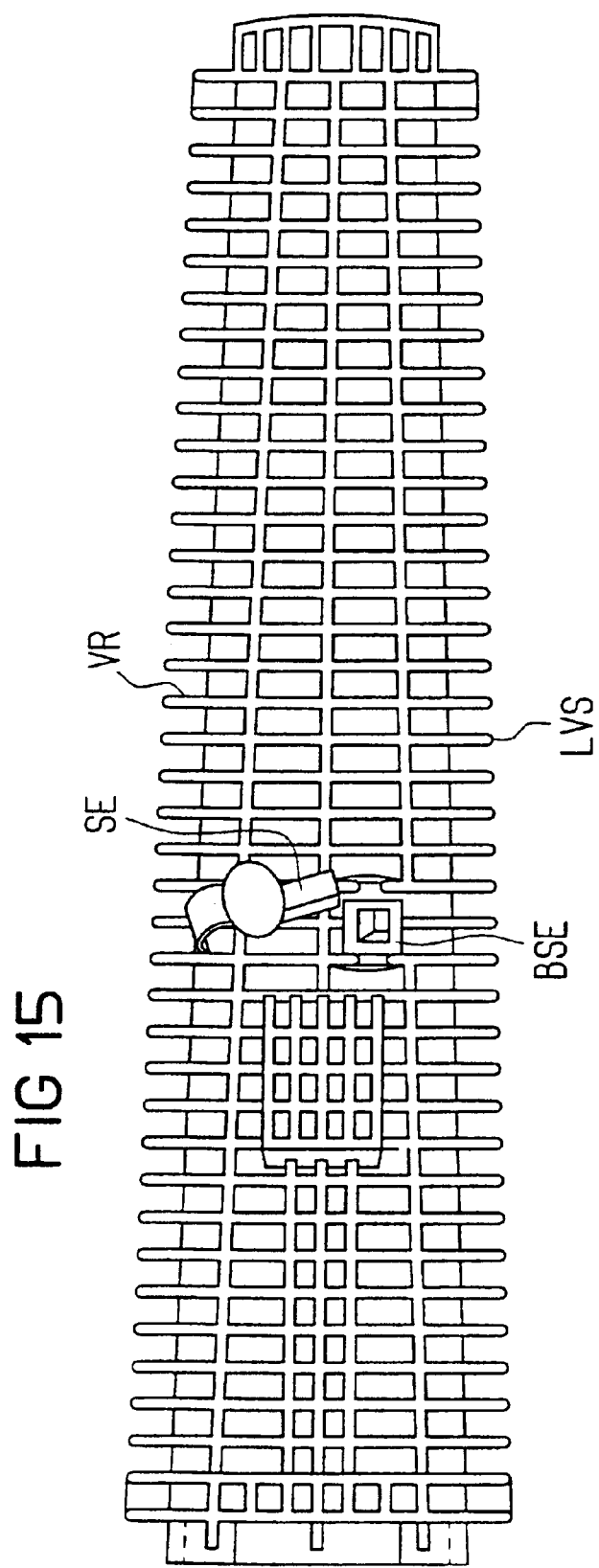

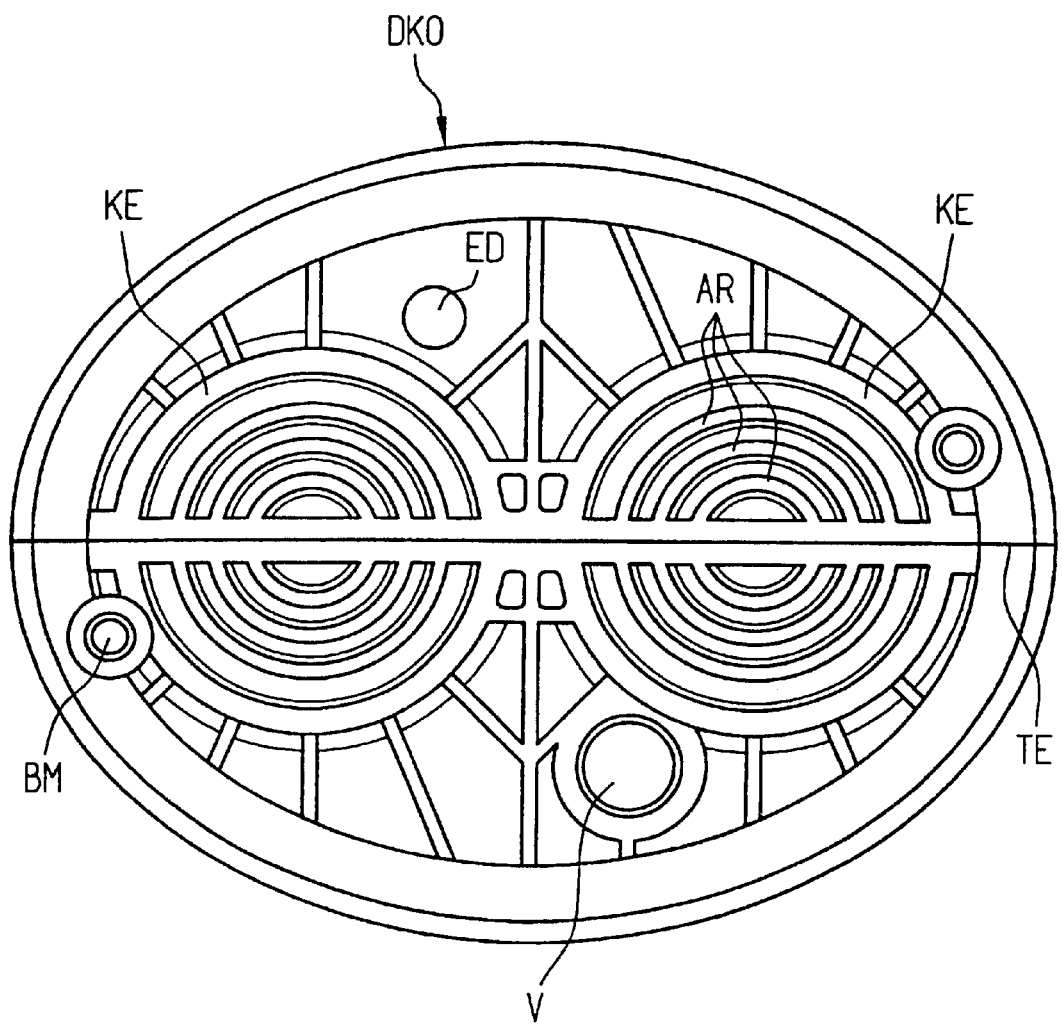

UNIVERSAL CABLE FITTING

BACKGROUND OF THE INVENTION

The invention relates to a cable fitting made of thermoplastic material, comprising a longitudinally divided sleeve tube, sealing bodies on the end sides, a sealing system which is arranged on the longitudinal side and is made of a groove running along the longitudinal edges, and also comprising a longitudinal seal and a clamping rail, as well as encircling seals between the sealing bodies and the sleeve tube.

In the field of cable fittings, a very large number of possible applications and combinations and, accordingly, also a very large number of different types of cable fittings are known. Nevertheless, these cable fittings are only designed for a specific application in each case.

Thus, for example, cable fittings made of half-shells with lamellae located one behind the other in the sealing regions are know (EP 0 778 643). A specific form of sleeve tube is known from U.S. Pat. No. 4,865,893. U.S. Pat. No. 5,006,669; EP 0 403 937 and EP 0 923 178 describe cable sleeves with sealing bodies. An arrangement with multiple cable introductions in cable sleeves is illustrated in U.S. Pat. No. 5,545,852. A dividing sleeve with a large number of cable introductions can be gathered from DE 4 330 294, and PCT/DE99/01985 presents a sealing body for cable fittings. Furthermore, cable-clamping arrangements are already known from U.S. Pat. No. 4,752,653 and EP 0 752 747. Longitudinal closures for cable fittings can be gathered from EP 0 780 947, and PCT/DE99/01945 illustrates a connecting element for encircling seals.

It can be gathered from this prior art that there is a variety of vary different types of sleeve, one example of which, coordinated with the relevant application, is decisive in each case.

SUMMARY OF THE INVENTION

This results in the object of the present invention being to provide a cable fitting which is suitable for universal use, with the result that there is a single family of sleeves on the coordinated basic building blocks of which it is possible to put together any desired combination. The set object, then, is achieved by a cable fitting of the type explained in the introduction in that the sleeve tube has on the end sides, in the encircling sealing regions, universal mounts in which a selection of sealing bodies with a wide range of different functional units can be inserted universally, the encircling sealing regions of all the sealing bodies covering a family of cable fittings being coordinated with the corresponding universal mounts of the sleeve tube.

In the case of the invention, then, it is advantageous that a family of cable fittings contains basic building blocks which cover all applications, are all coordinated with one another and can be inserted in a basic sleeve tube. This basic family of cable fittings is merely subdivided into different type series, the individual type series merely differing by way of their diameter and, if appropriate, by way of the length of the sleeve tube. This produces an entire range of cable fittings which, on account of the corresponding configuration of the individual components, covers a large number of possible combinations encompassing all conceivable applications and cable configurations. This family of cable fittings may be constructed as a transition sleeve and as a cover sleeve. This produces a uniform appearance throughout and thus makes the job of the fitter considerably easier since he is carrying out the installation of a system familiar to him. He does not have to be prepared, as has been the case hitherto, for different sleeve combinations in the case of different applications, since the components available to him, in the case of the family of cable fittings according to the invention, are familiar.

The selection of a series of cable fittings from the entire family of cable fittings is determined by the type, diameter and number of cables which are to be introduced and by the necessary splicing volume. In general, the entire application area is sufficiently covered by four different basic diameters and different lengths, it additionally being possible for the length to vary. Moreover, it is possible for the family of cable fittings to have its basic building blocks carried out equally well with an oval appearance as with a circular appearance.

BRIEF DESCRIPTION OF THE DRAWINGS

The invention will now be explained in more detail hereinbelow with reference to 16 figures, in which:

FIG. 1 shows a divided sleeve tube which is significant for the invention,

FIG. 2 shows an end view of the divided sleeve tube,

FIG. 3 shows the design of the longitudinal closure,

FIG. 4 shows a two-part sealing body,

FIG. 6 shows the drawing relating to a cable-clamping arrangement with pressure-exerting plates, FIG. 7 shows a pressure-exerting plate for cable clamping according to FIG. 6, FIG. 8 shows a two-part sealing body with extensions in which a cable-clamping arrangement can be fitted, FIG. 15 shows a wedge-shaped closure rail for the longitudinal closure, and FIG. 16 shows a two-part sealing body for an oval series of cable fittings of the family of cable fittings.

DETAILED DESCRIPTION OF THE INVENTION

Figure 5:
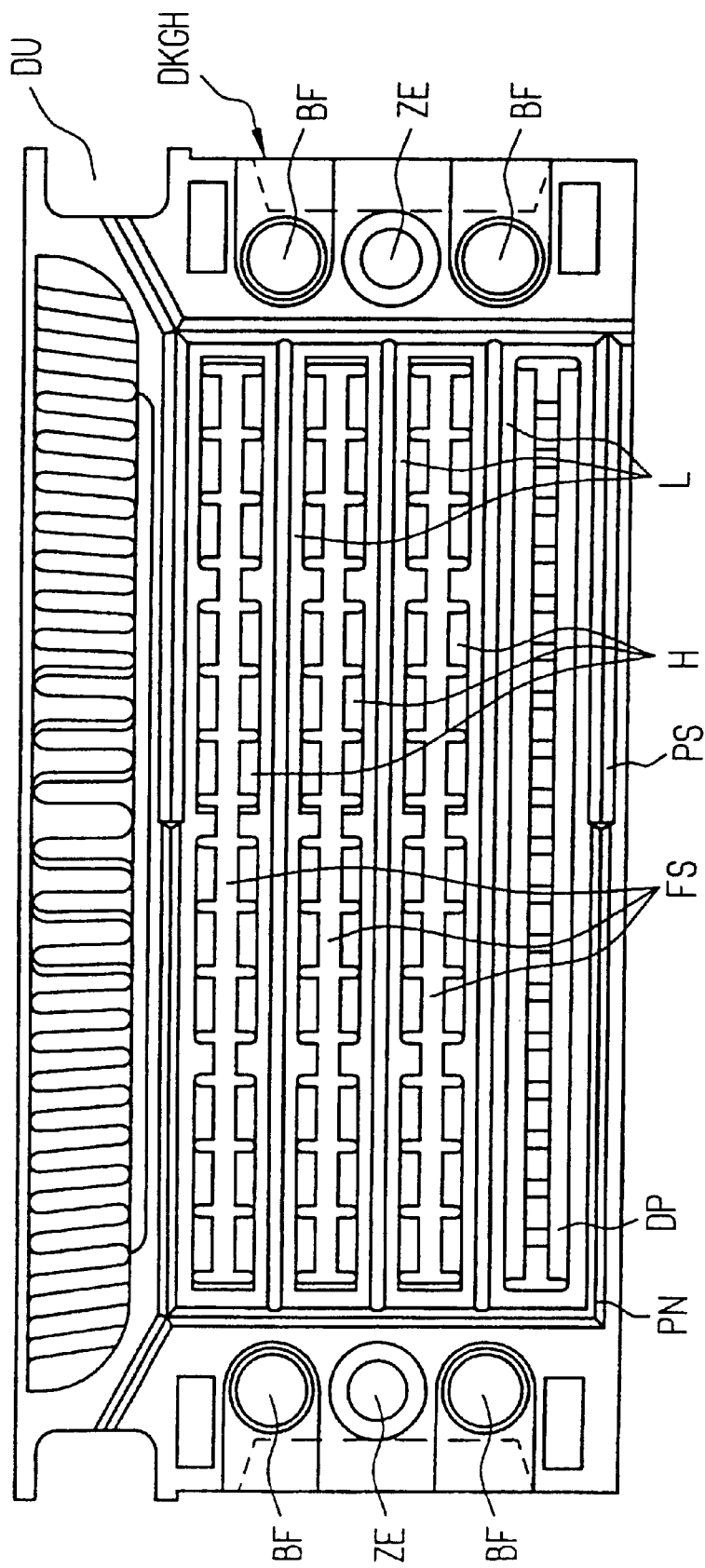
FIG. 5 shows the configuration of the sealing body in a view of the separating plane.

FIG. 1 illustrates a sleeve tube MR on which the principle of the family of cable fittings is based. All of the sleeve tubes MR belonging to the family of cable fittings are slit longitudinally and have identical mounts for longitudinal seals LD and closure elements in the form of wedge-shaped and undercut clamping beads KW1 and KW2 over all lengths and diameters. During closure, an adapted wedge-shaped closure rail is drawn on over the clamping beads KW1 and KW2. Arranged in the center of the sleeve tube MR are aligning elements AE1 and AE2, which give a clear position when the sleeve tube MR is closed. A groove/tongue system is provided along the longitudinal edges of the sleeve tube MR and causes the longitudinal seal to be subjected to pressing during closure. During assembly, the sealing bodies with their wide range of different functional units are inserted in the sealing regions DB of the sleeve tube MR, the crossover region between the longitudinal seal and the encircling seal constituting a problem zone For this reason, according to the invention, the sealing groove, which cannot be seen here, is provided toward the inside, in the direction of the encircling seal, with a cutout into which an extension AS of the longitudinal seal LD penetrates. In order that, moreover, in the case of this crossover, there is no feared formation of interstices by the longitudinal edges of the sleeve tube coming into contact with one another in a tilted manner, the sleeve tube MR has rounded or toothed profilings P in the region of the cutouts along the sealing groove. The cutout in the sealing groove and the extension AS in the longitudinal seal LD produce direct contact with the encircling seal located in the sealing groove of the sealing body. The profiles P produce yielding cavities for the extension AS of the longitudinal seal LD, with the result that it is easily possible to cover the cases of tolerance for seals in this region. The longitudinally directed interstices which may possibly form during closure of the sleeve tube MR are also closed in this way, with the result that it is possible to achieve a sealing action which fulfills the requirements in the longitudinal direction.

The longitudinal seal LD is produced form a silicone profile. The advantage over hitherto conventional seals made of formed material is as follows. The foamed profiles are always made of a closed-cell foam. This, however, has the disadvantage that, over time, under loading, the air enclosed in the cells diffuses out, with the result that the seal loses all the restoring forces. This means that the sealing action is lost and leakage may occur. In the case of the silicone profile according to the invention, however, the restoring forces are achieved via the elasticity of the material, which remains fully intact over time. A further disadvantage with the production of the foamed profiles is that environmentally harmful blowing agents are used.

FIG. 2 shows an end view of the sleeve tube MR according to FIG. 1 on which the family of cable fittings according to the invention is based. It is characteristic here that, in the open state, the basic shape of the sleeve tube MR, which is injection molded from thermoplastic material, is not circular. This deviation from the circular shape is characterized by a continuously increasing additional curvature ZK of the free legs of the sleeve tube MR. The arrows of the additional curvature ZK, which are of different lengths, symbolize the increase in the inwardly directed additional curvature, this increasing additional curvature ZK extending in both directions from the vortex S located opposite the longitudinal opening. This means that, when the sleeve tube MR is closed, the open longitudinal edges have their abutment surfaces SF in planar abutment against one another in the closed state and form a tangential transition in the interior. Consequently, first of all, the closing forces are minimized to a considerable extent and, secondly, it is ensured that a tangential transition is produced in the interior of the closed sleeve tube along the longitudinal-side separating line. In the case of a purely circular sleeve tube without any additional curvature according to the invention, this tangential transition is not initially achieved, with the result that an interstice-like opening, which as already been described above, remains at least initially in the abutment region. It is only when the closure beads are subjected to a high level of force that the abutment surfaces are tilted in and come into planar abutment against one another. The configuration according to the invention thus provides a considerable improvement in the sealing conditions along with a lower application of force. This figure also shows the two wedge-shaped clamping beads KW1 and KW2, on which the aligning elements AE1 and AE2 project.

FIG. 3 presents, in cross section, the longitudinal closure in the end region of the sleeve tube MR, in which the sealing bodies with their wide range of different functional units are inserted. It can be seen here that one longitudinal edge has a sealing groove DN and the opposite longitudinal edge has a sealing tongue DF, the two engaging one side the other during closure. Also introduced in the sealing groove is a cutout AD in which the extension AS of the longitudinal seal LD described in FIG. 1 engages. By means of a corresponding wedge-shaped closure rail (not shown here), the longitudinal seal to be subjected to pressing the results in sealing of the longitudinal region.

FIG. 4 shows a two-part sealing body DKG from the family of cable fittings according to the invention, in the case of which cable-introduction openings KEO have already been introduced in the separating plane TE. By way of these cable-introduction openings KEO, it is possible, since they are located in the separating plane TE, for uncut cable to be introduced and led out. Also provided in this sealing body DKG are closed cable-introduction openings KEG, which, if required, can be opened, by removal of the closure, for the insertion of cut cables. It is also possible to see the encircling sealing groove DU, into which an encircling seal is inserted for sealing in relation to the enclosing sleeve tube. This sealing body DKG is adapted, in its external diameter, to the diameter of a series of cable fittings within the family of cable fittings. The individual series of cable fittings differ from one another merely by way of the diameter, in order to adapt, for example, the necessary amount of space required within the cable fitting to the application. Otherwise, all the sealing bodies have the same appearance as well as the same design details, this making the work of the fitter considerably easier. It is also possible for the same tools and installation means to be used for all the cable fittings of the entire family of cable fittings.

FIG. 5 shows a view of the half DKGH of the sealing body DKG shown in FIG. 4. This illustration shows that the sealing body, and thus also the half DKGH of the sealing body, is formed from lamellae L located one behind the other in the axial direction. Profiled filling disks FS are introduced into the cavities H located between the individual lamellae L in order to obstruct the outflow of the sealing compound which is later introduced. It can also be seen from this illustration that profile grooves PN are introduced into the separating surface, excess sealing compound penetrating into said profile grooves during closure. Also arranged in this separating plane are profile ridges PS, by means of which the two joined-together halves DKGH of the sealing body are additionally adjusted in relation to one another. It is also possible to see the encircling sealing groove DU into which, in the assembled state, an encircling seal is introduced for sealing in relation to the sleeve tube. Arranged in the lateral regions of the halves DKGH of the sealing body are centering units ZE which are of assistance when the two halves are assembled. The two halves DKGH of the sealing body are connected with the aid of screws which are inserted, and fixed, in fastening bores BF. It is also possible, however, to use, for fastening purposes, so-called Ejot screws which cut into the plastic, with the result that additional threaded elements may be dispensed with.

FIG. 6 shows a drawing of a sealing body DK in which use is made of a cable-clamping arrangement, comprising pressure-exerting plates DP and a pressure-exerting bracket DB acting thereon. In this case, the cable-introduction openings KEB are produced by drilling and, since they are located in the separating plane, it is also possible here for uncut cables to be introduced. The pressure-inserting plates DP of this cable-clamping arrangement are introduced in opposite cavities between the lamellae of the sealing-body halves and have their introduction openings cut out likewise to correspond to the diameter of the introduced cables. In this case, the diameters of these cutouts is slightly smaller than the cable-introduction openings KEB, in order to achieve a certain constriction of the cable. The sealing plates DP are pressed onto the introduced cables with the aid of pressure-exerting brackets, which act on the sealing plates with the aid of fastening screws BS during adjustment of the cable-clamping arrangement.

FIG. 7 shows such a pressure-exerting plate DP as are inserted into the cavities between the individual lamellae of the sealing-body halves. These sealing plates DP have reinforcing profiles, which produce increased rigidity. The introduction or clamping opening are introduced during installation in accordance with FIG. 6.

Figure 9:
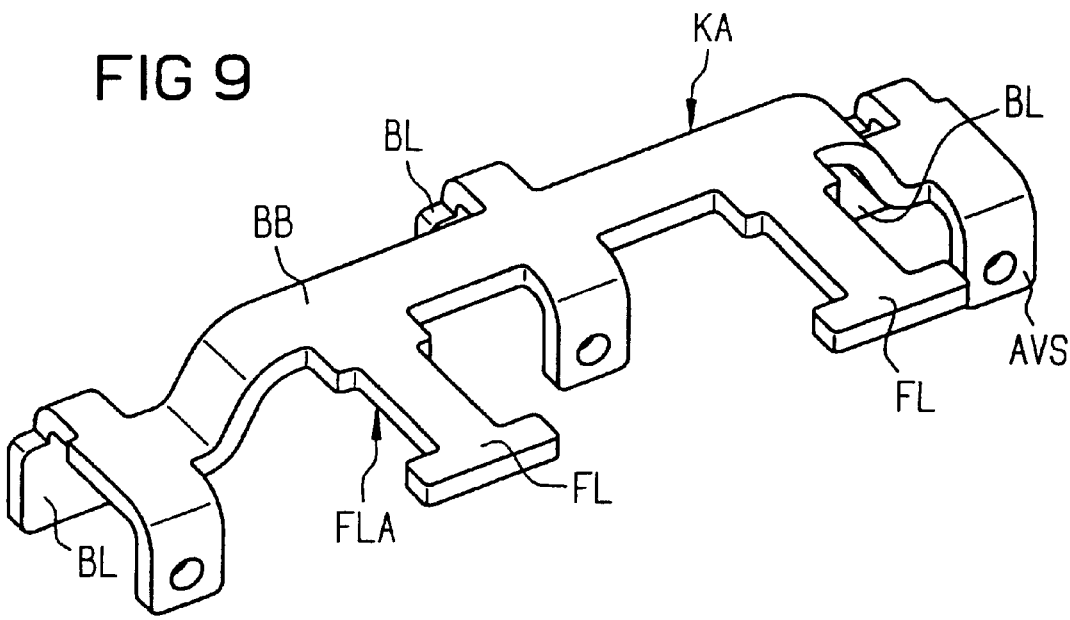
FIG. 9 shows a cable-clamping arrangement for the configuration according to FIG. 8.

FIGS. 8 and 9 illustrate a cable-clamping arrangement for sealing bodies of the family of cable fittings which is attached on the inside of the sealing body DKG. FIG. 8 shows another two-part sealing body DKG, in the separating plane TE of which cable-introduction openings KE0 are arranged. Further cable-introduction openings KEG are also provided, these preferably being closed off on the outside and only being opened if required. Arranged in the positions of the cable-introduction openings, then, in the case of this version of the cable-clamping arrangement, are groove extensions KAN, in the grooves of which the insert KA of the cable-clamping arrangement, said insert being illustrated in FIG. 9, is guided.

This insert KA of the cable-clamping arrangement comprises a fastening arc BB on which fastening lugs BL are integrally formed. These fastening lugs BL are introduced into the grooves of the extensions KAN of the sealing body and are displaced therein in each case until the fixing lugs FL, which project for fastening the cables, come to rest in the region of the cables which are to be gripped. These fixing lugs FL have cutouts FLA in which a clamping band, by means of which the cable is clamped in, is guided in each case. Sufficient fixing in the longitudinal direction is thus achieved for the cables in each case. Furthermore, the fastening arc BB is provided with extensions AVS to which, for example, connecting rails or connecting lines may be attached, via which it is then possible to produce, for example, an electrically conductive connection between all the cable-clamping devices. It can also be seen from FIG. 8 that bores BF for fastening the sealing-body halves in relation to one another are arranged on both sides of the centering element ZE. The encircling sealing groove DU can also be seen. Also provided in the halves of the sealing body DKG are cutouts AV in which connecting rails for arresting and fixing the mutually opposite sealing bodies in relation to one another are inserted and fastened.

Figure 10:
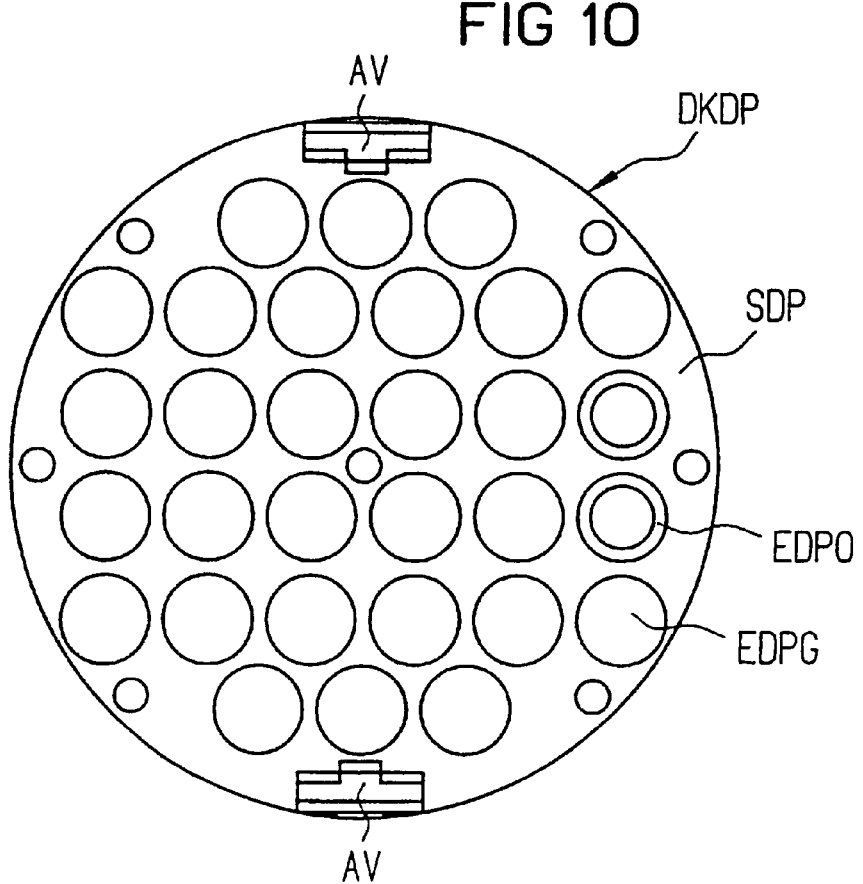
FIG. 10 shows the drawing of a sealing body made of two sealing disks and an elastic disk mounted therebetween.

FIG. 10 illustrates a sealing body DKDP which is assembled from two stable sealing disks SDP located one behind the other in the axial direction, an elastic sealing disk being arranged between said two sealing disks SDP. This elastic sealing disk may bridge, for example, all the introduction openings, as in illustrated by EDPG, with the result that only the necessary cable-introduction openings have to be cut out in each case. In this case, the cable-introduction openings are cut out with a relatively small diameter, as is illustrated by DEPO, with the result that a closely abutting lip seal is formed when the cables are introduced. It is also possible, however, for the elastic sealing plate to have stub-like formations which project outward in the cable-introduction openings of the sealing disks. If required, these stub-like convexities may then be opened by cutting. Cutouts AV for the insertion of connection rails are also indicated. The formation of the seals in relation to the sleeve tube, for the sake of clarity, have not been illustrated here; however, they correspond to the configurations in accordance with the family of cable fittings.

Figure 11:
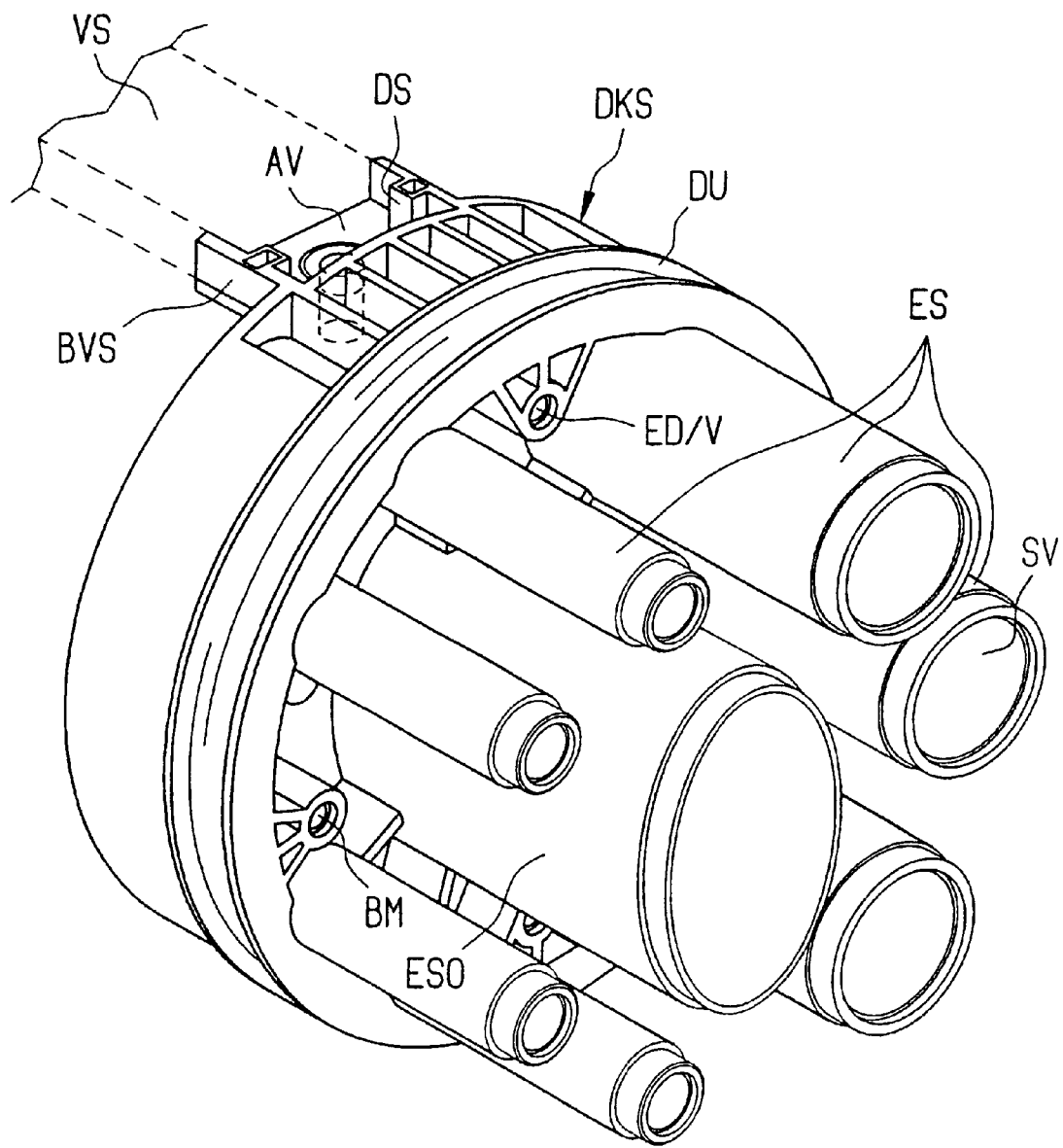
FIG. 11 shows a sealing body with cable-introduction stubs.

FIG. 11 shows a further sealing body with functional units for insertion according to the invention in the family of cable fittings. This sealing body GKS may be inserted in the same way in a sleeve tube by way of its encircling sealing groove DU. Cable introduction here takes place in each case by way of an introduction stub ES which is integrally formed on the outside. These introduction stubs ES may, in turn, be closed off by corresponding closure elements SV, which are then cut off or removed if required. The cable-introduction stubs ES bay be of cylindrical or also of conically tapering design, it being possible, in the case of the latter configuration, for corresponding adaptation to the respective cable diameter to take place at the same time. The sealing between the introduction stubs ES and the cable which is introduced in each case takes place, for example, with the attachment of heat-shrinkable-sleeve elements which, following the introduction of the cables, are shrunk onto the ends of the introduction stubs ES and onto the cable jacket. It is similarly possible for the sealing body DKS shown here to be provided with heat-shrinkable introduction stubs ES, with the result that the additional heat-shrinkable-sleeve elements may be dispensed with. The introduction stubs ES are preferably of different diameters with the result that, depending on the cable, it is possible to make a preliminary selection. Arranged in the center of the sealing body DKS in this case is an elliptical or oval introduction stub ESO, the shape of this introduction stub ESO being selected such that an uncut cable can be introduced if the latter is bent in the form of the U. It is also illustrated here that fastening points BM are provided, at which points the cable fitting can be fastened on a mast or the like. In the same way, it is also possible to provide bores ED/V in which, for example, a valve or a ground bushing can be inserted. Moreover, a fastening arrangement for a fastening rail VS is illustrated on the inside of the sealing body DKS, rotation-prevention means DS being arranged in the cutout AV provided. In this way, it is possible of the connecting rail VS indicated here to be fastened in a rotationally and torsionally fixed manner. The connecting rail VS is likewise anchored on the opposite sealing body, with the result that they are fixed in position in relation to one another.

Figure 12:
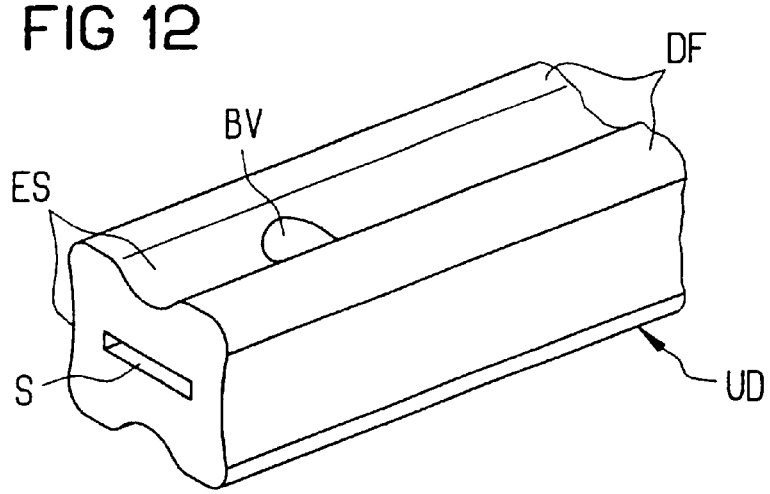
FIG. 12 shows the end section of an encircling seal.

FIG. 12 shows the end of an encircling seal UD which differs from the hitherto known sealing profiles made of foamed plastic. The cross section of this novel seal for insertion in the encircling sealing groove of the sealing bodies has a so-called corrugated profile, which is produced by depressions ES being formed in the longitudinally running surfaces of the encircling seal UD. The sealing surface is thus subdivided in each case into two longitudinally running sealing surfaces, as a result of which the sealing action is increased. Additionally produced in the depressions ES, between the elevations, is a storage space, in which the sliding paste which is usually used is protected. In the case of the round profiles which have been used hitherto, the sliding paste applied, as a result of the movements of the sleeve tube relative to the sealing body, is wiped off, for example, by way of temperature fluctuations and thus loses its effect. This is avoided by the corrugated profile of this present encircling seal UD. For installation, it is expedient for the encircling seals to be divided in the transverse direction, with the result that they can easily be introduced into the encircling sealing groove of the sealing bodies. The abutting ends of the encircling seal UD are usually held together by so-called joiners. Since, however, the seal thus appears to harden to a very solid state in this region as a result of the joiner introduced, different forces act there, which may result in a reduction in the sealing capacity. There is also the risk of the seal not being closed correctly by the fitter or of the seal opening again. This may result in leakage in the sealing region. In the case of the encircling seal UD for the family of cable fittings of the present invention, this is prevented by a closure, the latter functioning in a manner similar to a chain lock. For this purpose, however, it is necessary to provide closure bores BV, in which the closure is inserted, at each end of the encircling seal UD. It would thus be possible for the slits S which were previously necessary for the insertion of joiners to be dispensed with.

Figure 13:
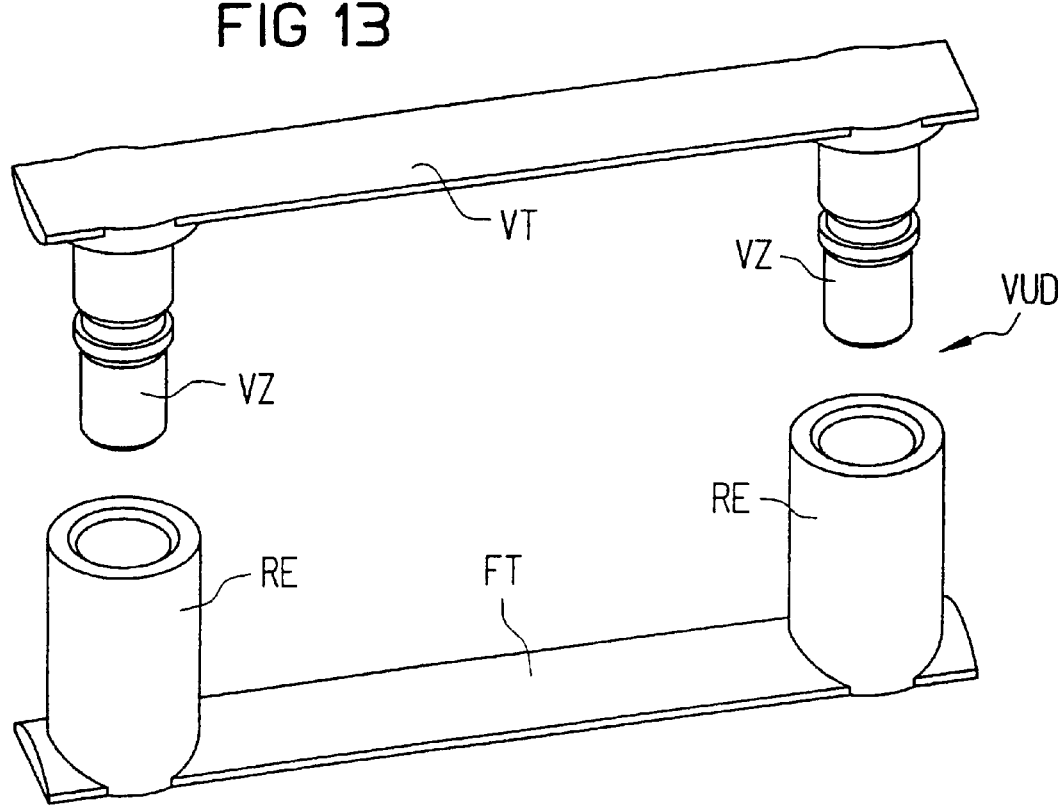
FIG. 13 shows a connection element for a cut encircling seal.

FIG. 13 illustrates a connecting element VUD for bridging the separating location of a divided encircling seal, as is described in FIG. 12. The connecting element VUD comprises a fixing part FT, with two tubular elements RE spaced apart from one another on a connecting rail, and a closure part VT, with stubs VZ spaced apart by the same distance. During installation of said closure element VUD, the two tubular elements RE are introduced through the bores in the ends of the encircling seal. The closure part VT is then attached from the other side, the stubs VZ being forced into the tubular elements RE with latching action. The encircling seal is thus bridged by the connecting element VUD at its separating location and fixed in position.

Figure 14:
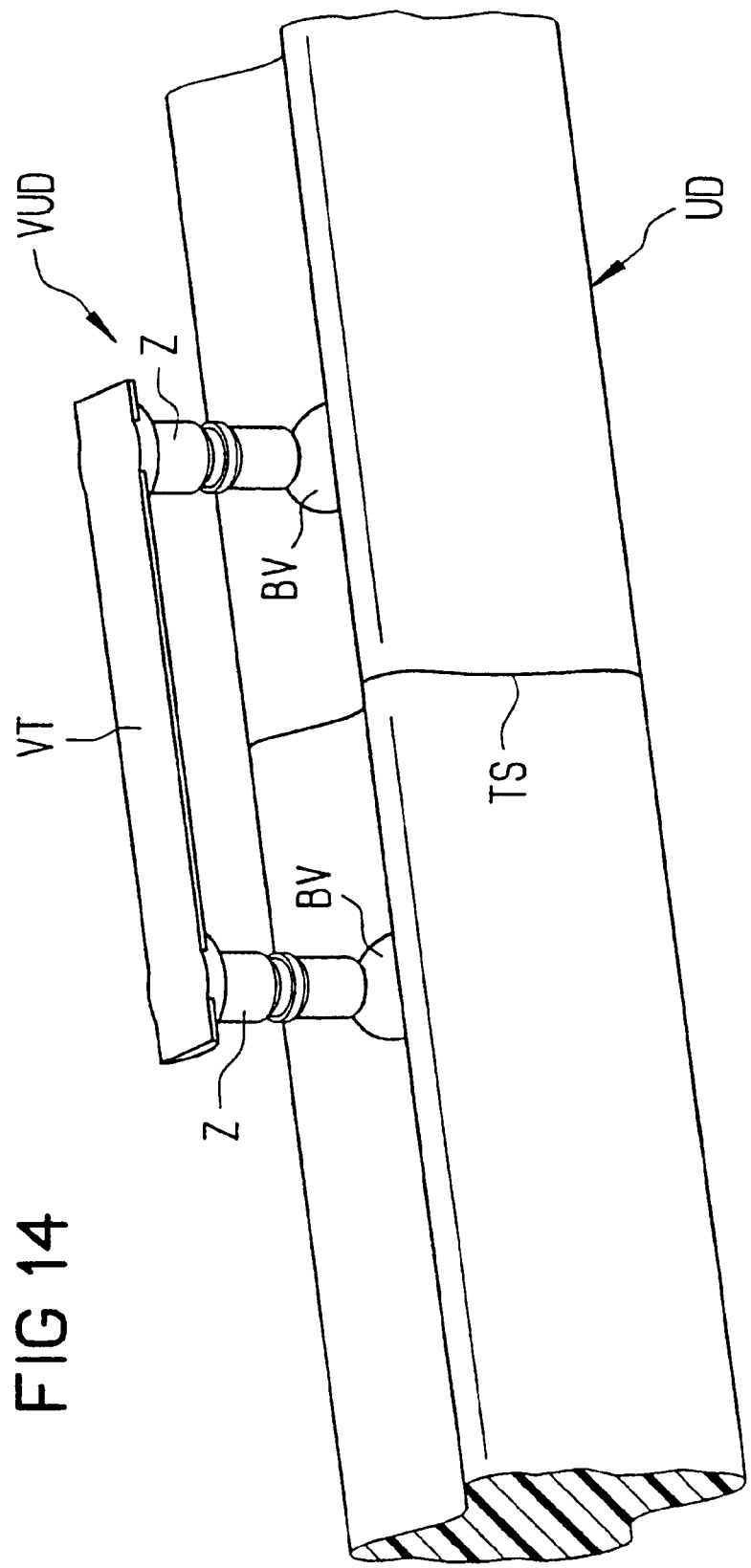
FIG. 14 shows the use of the connecting element.

FIG. 14 illustrates the operation which takes place during the installation of the connecting element, as has already been described in FIG. 13.

FIG. 15 shows a closure rail LVS for closing the longitudinal opening of a sleeve tube of the family of cable fittings. The closure rail LVS shown is injection molded from plastic and has reinforcing ribs VR extending over and beyond the entire outer surface. The closure rail LVS also contains a bore BSE into which a securing element SE, which is fitted in captive fashion and it in the form of a pin, is plugged and latched in the clamping bead located thereebeneath. This ensures that the closure rail LVS cannot be released automatically. The underside of the clamping rail has an undercut, wedge-shaped longitudinally running accommodating groove in which the clamping beads of the sleeve tube are pressed together.

FIG. 16, finally, shows yet another sealing body DKO, the basic shape of which is oval. This then has a correspondingly oval sleeve tube with sealing bodies DKO inserted on the end sides thereof. This means that it is possible for the family of the cable fittings to include a series of cable fittings of oval cross section. It is possible here for all the hitherto circular sealing bodies to be changed over into an oval shape without any change in conditions. Such cable fittings are provided for special cases where there is restricted expansion in one direction. The appearance of the family of cable fittings, however, remains largely the same. A further variant for cable-introduction openings, which may likewise also be used for circular sealing bodies, is illustrated for this sealing body DKO. These openings are concentrically arranged, initially closely adjacent rings AR which are cut out depending on the diameter of the cable which has to be introduced. In comparison with the operation of drilling the sealing body, this renders installation considerably easier. Moreover, bores and openings BM, ED and V, through which or on which it is possible to insert fastening means, ground bushings or valves, are also provide here. This is also a two-part sealing body DKO, in the separating plane TE of which a sealant is introduced prior to assembly.

What is claimed is:

1. A cable fitting comprising:
    a longitudinally divided sleeve tube (MR) having longitudinal sides and end sides at the opposite ends of the longitudinal sides, the sleeve tube defining a longitudinal opening adjacent the longitudinal sides and sealing regions (DB) adjacent the end sides;
    sealing bodies (DKG, DK, DKDP, DKS, DKO) disposed at the end sides of the sleeve tube in the sealing regions; and
    a sealing system comprising
        a longitudinal sealing groove (DN) arranged along one of the longitudinal sides of the sleeve tube;
        a longitudinal sealing tongue (DF) arranged along the other of the longitudinal sides of the sleeve tube and opposite the longitudinal sealing groove;
        a longitudinal seal (LD);
        a closure rail (LVS) for closing the longitudinal opening defined by the sleeve tube; and
        encircling seals (UD) disposed between the sealing bodies and the sleeve tube in the sealing regions;
    wherein the sealing bodies have encircling sealing grooves (DU) for receiving the encircling seals and the longitudinal sealing groove has a cutout (AD) for receiving an extension (AS) of the longitudinal seal so that the encircling seals are in contact with the longitudinal seal when the longitudinal opening is closed by the closure rail.

2. A cable fitting according to claim 1 wherein the longitudinal sealing tongue comprises profiles (P) that define yielding cavities for the extension of the longitudinal seal.

3. A cable fitting according to claim 1 wherein the sealing bodies define an axial direction and are divided along a dividing plane (TE) transverse to the axial direction into a plurality of sealing body portions that define cable introduction openings (KE, KEO) arranged on the dividing plane.

4. A cable fitting according to claim 1 wherein the sealing bodies define an axial direction and at least one cable introduction opening extending in the axial direction.

5. A cable fitting according to claim 1 wherein the sealing bodies define an axial direction and at least one cable introduction opening extending in the axial direction and wherein the sealing bodies comprise at least two rigid plates (STP) positioned one behind another in the axial direction with an elastic disk between each pair of the rigid plates.

6. A cable fitting according to claim 5 wherein the elastic disk has initially closed truncated cones directed outwardly through each cable introduction opening.

7. A cable fitting according to claim 5 wherein a cable is inserted through the at least one cable introduction opening and wherein a sealant is provided between the cable and the inner surface of the at least one cable introduction opening.

8. A cable fitting according to claim 5 wherein at least one cable introduction opening is closed by a stopper (VS).

9. A cable fitting according to claim 1 wherein the sealing bodies comprise at least one outwardly directed, initially closed introduction stub (ES, ESO).

10. A cable fitting according to claim 9 wherein each introduction stub is sealed with a heat-shrinkable sleeve.

11. A cable fitting according to claim 9 wherein at least one introduction stub is closed by a stopper (VS).

12. A cable fitting according to claim 1 wherein the sealing bodies define an axial direction and wherein at least one of the sealing bodies is formed of a plurality of lamellae (L) located one behind another in the axial direction and encased by a ring that defines the encircling sealing groove for receiving the encircling seal.

13. A cable fitting according to claim 1 wherein the longitudinal seal is formed from a profiled silicone material.

14. A cable fitting according to claim 1 wherein the encircling seals are formed from a profiled silicone material.

15. A cable fitting according to claim 1 wherein the sleeve tube has a non-circular cross section when the longitudinal opening is closed by the closure rail.

16. A cable fitting according to claim 1 wherein the sleeve tube has a non-circular cross section when the longitudinal opening is not closed by the closure rail and wherein the sleeve tube defines a vertex (S) located opposite the longitudinal opening and has an additional curvature (ZK) in the inward direction such that mutually opposite abutment surfaces (SF) on the longitudinal sides come into planar contact with one another and form a tangential transition when the longitudinal opening is closed by the closure rail.

17. A cable fitting according to claim 1 further comprising clamping beads (KW1, KW2) on the longitudinal sides for engaging the closure rail to close the longitudinal opening.

18. A cable fitting according to claim 1 wherein the sealing bodies define an axial direction and wherein at least one of the sealing bodies is formed of a plurality of lamellae (L) located one behind another in the axial direction, the cable fitting further comprising a cable-clamping arrangement comprising at least a pair of pressure-exerting plates (DP) positioned between the lamellae and having at least one cable introduction opening (KEB) extending in the axial direction, the pressure-exerting plates being fixed onto a cable extending through the cable introduction opening by a pressure-exerting arrangement (DB).

19. A cable fitting according to claim 1 further comprising a cable-clamping arrangement (KA) comprising
 a fastening arc (BB);
 at least one fixing lug (FL) provided on the fastening arc; and
 at least one fastening lug (BL) provided on the fastening arc.

20. A cable fitting according to claim 1 wherein the sealing bodies are aligned with one another and fixed to one another by at least one longitudinal connecting rail (VS).

21. A cable fitting comprising:
 a longitudinally divided sleeve tube (MR) having longitudinal sides and end sides at the opposite ends of the longitudinal sides, the sleeve tube defining a longitudinal opening adjacent the longitudinal sides and sealing regions (DB) adjacent the end sides;
 sealing bodies (DKG, DK, DKDP, DKS, DKO) disposed at the end sides of the sleeve tube in the sealing regions; and
 a sealing system comprising
  a longitudinal sealing groove (DN) arranged along one of the longitudinal sides of the sleeve tube;
  a longitudinal sealing tongue (DF) arranged along the other of the longitudinal sides of the sleeve tube and opposite the longitudinal sealing groove;
  a longitudinal seal (LD);
  a closure rail (LVS) for closing the longitudinal opening defined by the sleeve tube; and
  encircling seals (UD) disposed between the sealing bodies and the sleeve tube in the sealing regions;
 wherein the sealing bodies have encircling sealing grooves (DU) for receiving the encircling seals and the encircling seals have a generally rectangular cross section with rounded corner edges and depressions (ES) between the rounded corner edges.

22. A cable fitting comprising:
 a longitudinally divided sleeve tube (MR) having longitudinal sides and end sides at the opposite ends of the longitudinal sides, the sleeve tube defining a longitudinal opening adjacent the longitudinal sides and sealing regions (DB) adjacent the end sides;
 sealing bodies (DKG, DK, DKDP, DKS, DKO) disposed at the end sides of the sleeve tube in the sealing regions; and
 a sealing system comprising
  a longitudinal sealing grove (DN) arranged along one of the longitudinal sides of the sleeve tube;
  a longitudinal sealing tongue (DF) arranged along the other of the longitudinal sides of the sleeve tube and opposite the longitudinal sealing groove;
  a longitudinal seal (LD);
  a closure rail (LVS) for closing the longitudinal opening defined by the sleeve tube; and
  encircling seals (UD) disposed between the sealing bodies and the sleeve tube in the sealing regions;
 wherein the sealing bodies have encircling sealing grooves (DU) for receiving the encircling seals and the encircling seals define an axial direction and are divided transversely to the axial direction and secured by a connecting element (VUD), the connecting element comprising
  a fixing part (FT) having a pair of spaced apart tubular elements (RE); and
  a closure part (VT) having a pair of spaced apart stubs (VZ) for engaging the tubular elements to latch the closure part to the fixing part; and
 wherein bores (BV) are provided on the encircling seals for engaging the tubular elements.

* * * * *